No. 788,631. PATENTED MAY 2, 1905.
M. COULERU.
MANUFACTURE OF CHLORATES AND PERCHLORATES.
APPLICATION FILED NOV. 12, 1904.
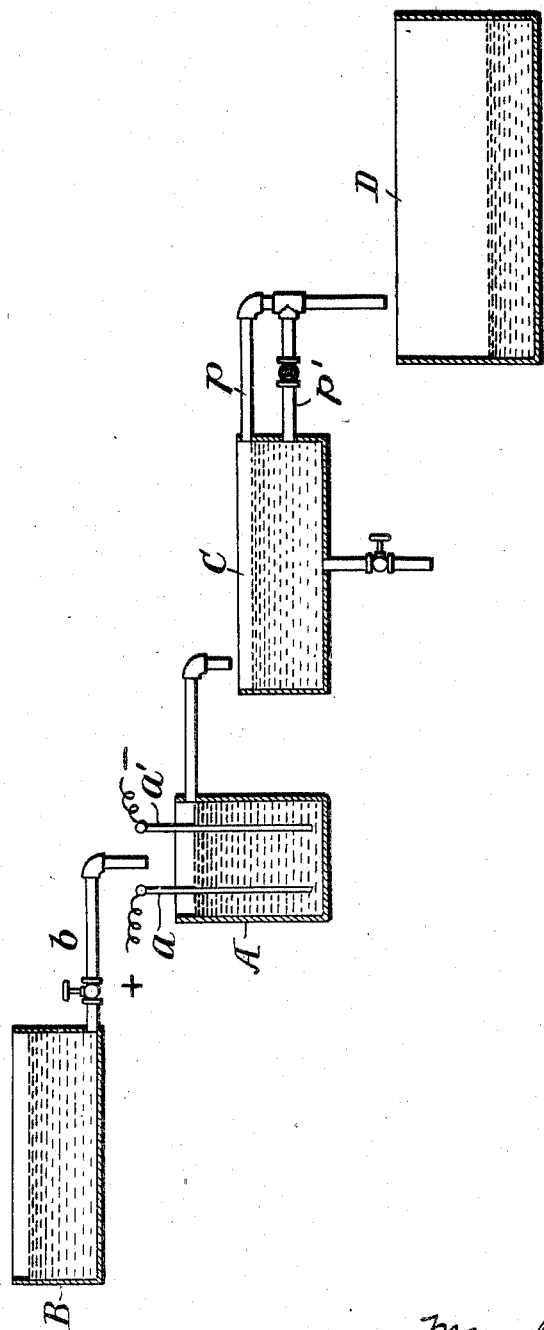

No. 788,631. Patented May 2, 1905.

UNITED STATES PATENT OFFICE.

MARCEL COULERU, OF GENEVA, SWITZERLAND.

MANUFACTURE OF CHLORATES AND PERCHLORATES.

SPECIFICATION forming part of Letters Patent No. 788,631, dated May 2, 1905.

Application filed November 12, 1904. Serial No. 232,443.

*To all whom it may concern:*

Be it known that I, MARCEL COULERU, a citizen of Switzerland, residing at Geneva, Switzerland, have invented certain new and useful Improvements in the Manufacture of Chlorates and Perchlorates, of which the following is a specification.

My invention relates to the electrolytical manufacture of chlorates—such, for instance as the chlorate of potassium, ($KClO_3$,) chlorate of sodium, ($NaClO_3$,) and the like—and the perchlorates of the same; and it has for its object to improve and simplify the process, to produce greater efficiency, to avoid the loss of chlorin, and to produce a secondary valuable product.

To these ends my improved process consists in the electrolytical manufacture of the chlorates and perchlorates combined with the manufacture of acid peroxids.

In the accompanying drawing I have shown diagrammatically an apparatus which may be used in carrying out my improved process.

In carrying out my improved process for the electrolytical manufacture of the chlorates and perchlorates I utilize the salts of certain metals, and especially the chlorid salts—such, for instance, as the chlorid of lead, ($PbCl_2$,) the chlorid of manganese, ($MnCl_2$,) &c. I utilize these for the neutralization of the alkali formed in the process during the electrolysis, and, further, I produce as a resultant of my process not only an increased yield of the chlorates and more efficient utilization of the electric current, but also an improved secondary product in the form of the acid peroxids—such, for instance, as the peroxid of lead, ($PbO_2$,) peroxid of manganese, ($MnO_2$,) and the like.

Heretofore in the usual processes of electrolytically manufacturing the chlorates and perchlorates of potassium and sodium, for instance, it has been common to add to a solution of the chlorid of the metal, as the chlorid of potassium, a neutral chromate, as the chromate of sodium, for instance, ($Na_2CrO_4$.) In carrying out these processes an alkali, as KHO, is continuously formed by the electrolytic action, the neutralization of which is necessary in order to produce satisfactory results. It has heretofore been proposed to employ hydrochloric acid to neutralize this continuously-formed alkali, and while this is effectual it is expensive, due to the cost of the acid and the loss of chlorin, besides being open to other objections. To overcome these and other objections, my process of electrolytically forming the chlorates and perchlorates consists in employing the salts of certain metals, and especially the chlorids of lead, manganese, and the like in order to eliminate the alkali. Chemically expressed the reactions may be stated as follows:

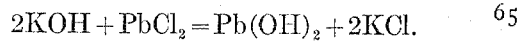
$$2KOH + PbCl_2 = Pb(OH)_2 + 2KCl.$$

The liquid resulting from the electrolytic action always contains more or less hypochlorites, and these hypochlorites immediately transform hydroxid of lead ($Pb(OH)_2$) into peroxid, ($PbO_2$,) according to the following equation:

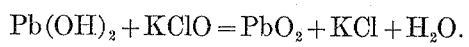
$$Pb(OH)_2 + KClO = PbO_2 + KCl + H_2O.$$

This peroxid, as $PbO_2$ or the like, is heavy and can be easily separated from the liquid and becomes a valuable subproduct from the main product of the process for manufacturing the chlorates.

While I have mentioned specifically the salts of certain metals, and especially the chlorids of lead, manganese, and the like, and have given the formula of the preferred metal used in carrying out my process, it is manifest that my invention is not limited to the use of the specific metals, but embraces as equivalents all known metals or salts of metals which when used substantially in the manner described produce substantially the same results to a greater or less extent. Thus it is obvious that I can use other metals, as tin, magnesium, calcium, &c., in accomplishing the purposes of my invention; but I have especially mentioned the chlorids of lead, as the subproduct resulting from the process when this is used is relatively more valuable than the subproducts resulting from the use of other metals.

While the process can be carried out in any suitable electrolytical apparatus and may be varied by those skilled in the art without departing from the spirit thereof, I have indicated in the accompanying drawing one construction and arrangement of apparatus which will aid in the understanding of the invention.

In the drawing, A represents an electrolytic cell and plus and minus the terminals of a circuit supplied with the proper electric current and connected to the electrodes $a$ $a'$.

B represents a reservoir containing the liquid, and it is shown as provided with a delivery-pipe $b$, arranged to continuously feed the cell A with the proper amount of the mixture.

C represents a receptacle to receive the electrolyzed liquid from the cell A, and in this receptacle I treat the electrolyzed liquid to neutralize the alkali and also conveniently utilize this receptacle to collect the secondary products, the main product passing from this receptacle by any suitable means, as the pipe $p$ or $p'$, into the receptacle D, which is a convenient means to receive the deposited chlorates.

To illustrate one complete embodiment of my invention and without limiting myself to the precise materials and proportions, I will say that the reservoir B may be supplied with a saturated solution of the chlorid of the material being treated, as potassium, sodium, or the like, together with a small proportion of a chromate—such, for instance, as the chromate of sodium—this solution being supplied to the electrolytic cell A and being subjected to the electrolytic action therein. The receptacle C receives the electrolyzed solution which contains a quantity of alkali, which, as before intimated, is objectionable and should be eliminated. To do this, I treat the liquid in the receptacle C with chlorid of lead ($PbCl_2$) in solid form, preferably in the form of a very fine powder and at a temperature of about 80° centigrade, (the action beginning at about 40° and continuing up to 90° or more, but being the most effective at about 80°.) In this receptacle C the peroxid of lead settles to the bottom and can easily be separated from the liquid, which flows on to the receptacle D, where the chlorate can be deposited and collected.

In carrying out the process the amount of alkali formed is dependent upon the amperes. The hypochlorites formed in the solution can be regulated by varying the temperature.

What I claim is—

1. The method substantially as hereinbefore described of manufacturing chlorates and perchlorates which consists in electrolyzing a chlorid solution to form chlorates and perchlorates and neutralizing the formed alkali by chlorid salts.

2. The method substantially as hereinbefore described of manufacturing chlorates and perchlorates which consists in electrolyzing a chlorid solution and neutralizing the formed alkali by the addition of chlorid of lead.

3. The method substantially as hereinbefore described of simultaneously producing chlorates and acid peroxid which consists in electrolyzing a chlorid solution, neutralizing the formed alkali by the addition of chlorid of lead and transforming the hydroxid of lead into peroxid of lead.

In testimony whereof I have signed my name to this specification in the presence of two subscribing witnesses.

MARCEL COULERU

Witnesses:
FRANK L. FREEMAN,
FRANCIS S. MAGUIRE.